United States Patent
Kawagoshi (10) Patent No.: US 6,433,496 B1
(45) Date of Patent: Aug. 13, 2002

(54) SEMICONDUCTOR INTEGRATED CIRCUIT FOR MOTOR CONTROL

(75) Inventor: Hirokazu Kawagoshi, Shiga (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/030,760

(22) Filed: Feb. 26, 1998

(30) Foreign Application Priority Data

Feb. 26, 1997 (JP) ............................................. 9-041851

(51) Int. Cl.[7] ................................................ H02P 3/08
(52) U.S. Cl. ...................... 318/254; 318/138; 318/439; 318/459; 318/500; 318/145; 388/928.1; 388/911
(58) Field of Search ................................ 318/254, 138, 318/805, 806, 145, 459, 439; 388/928.1, 911

(56) References Cited

U.S. PATENT DOCUMENTS

| 4,510,422 A | * | 4/1985 | Ogura .......................... 318/254 |
| 4,888,533 A | * | 12/1989 | Gotoh et al. .................. 318/254 |
| 4,900,993 A | * | 2/1990 | Yasohara et al. ............. 318/254 |
| 4,958,948 A | * | 9/1990 | Seima et al. .................. 388/812 |
| 5,319,290 A | * | 6/1994 | Yoshino et al. ............... 318/254 |
| RE35,124 E | * | 12/1995 | Erdman et al. ............... 318/599 |
| 5,486,743 A | * | 1/1996 | Nagai ........................... 318/439 |
| 5,491,393 A | * | 2/1996 | Uesugi ......................... 318/439 |
| 5,552,682 A | * | 9/1996 | Ushikoshi ..................... 318/254 |
| 6,058,031 A | * | 5/2000 | Lyons et al. ................... 363/67 |

FOREIGN PATENT DOCUMENTS

JP 61293191 * 12/1986

* cited by examiner

Primary Examiner—Robert E. Nappi
Assistant Examiner—Rina I. Duda
(74) Attorney, Agent, or Firm—Foley & Lardner (57) ABSTRACT

A motor controlling semiconductor integrated circuit for controlling a motor by a PLL control is provided comprising output transistors for driving a motor, a position detecting means detecting a rotational position of a rotor in said motor, for generating a position detection signal, a phase comparing means comparing said position detection signal with a reference clock, for generating a phase difference detection signal, and means receiving said phase difference detection signal, for controlling an on-duty of said output transistors on the basis of a duty of said phase difference detection signal.

6 Claims, 10 Drawing Sheets

SEMICONDUCTOR INTEGRATED CIRCUIT FOR MOTOR CONTROL

BACKGROUND OF THE INVENTION

1. Field of the Invention

The present invention relates to a semiconductor integrated circuit for motor control, and more specifically to a semiconductor integrated circuit for controlling a motor at a constant speed by a PLL (phase locked loop) and PWM (pulse width modulation).

2. Description of Related Art

Figure 10:
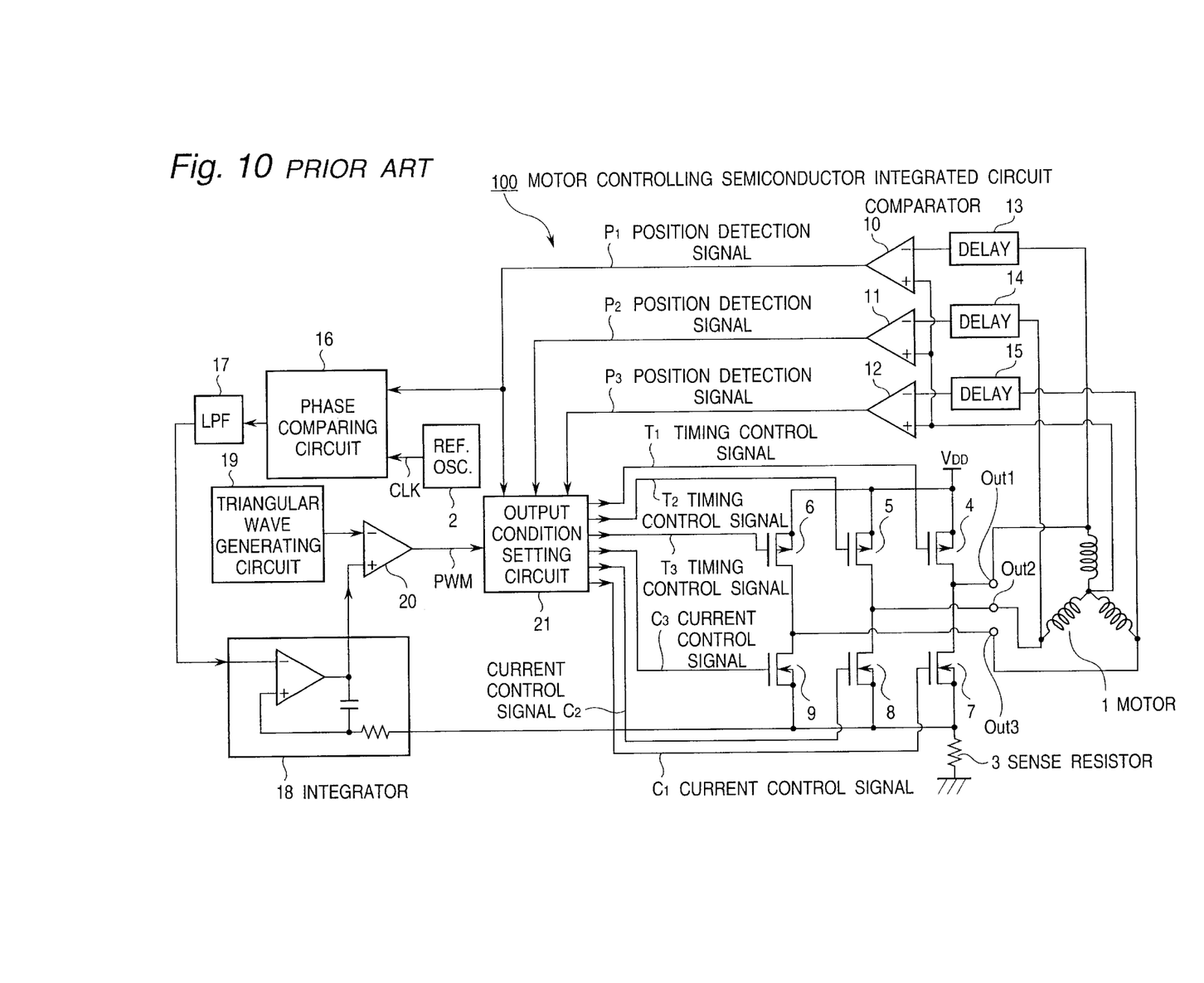
FIG. 10 is a block diagram of the prior art motor controlling semiconductor integrated circuit.

Referring to FIG. 10, there is shown a block diagram of one example of the prior art motor controlling semiconductor integrated circuit, which is generally designated with Reference Numeral 100. The semiconductor integrated circuit 100 is connected to a three-phase motor (spindle motor) 1 to be controlled, a reference oscillator 2 for generating a reference clock used for setting the number of revolution of the motor 1, a sense resistor 3 for detecting the current flowing through an armature coil at a stator side of the motor 1, and a DC power supply (not shown).

In the semiconductor integrated circuit 100, Reference Numerals 4, 5 and 6 designate output p-channel MOS transistors for controlling the timing of supplying the current to respective armature coils of the motor 1, and Reference Numerals 7, 8 and 9 denote output n-channel MOS transistors for controlling the amount of the current supplied to the respective armature coils of the motor 1. The transistors 4 and 7, 5 and 8, and 6 and 9 are connected in series, respectively. Respective sources of the transistors 4, 5 and 6 are connected in common to a power supply voltage terminal VDD, and respective sources of the transistors 7, 8 and 9 are connected in common to one end of the sense resistor 3 which is connected externally. The other end of the sense resistor 3 is connected to ground. A connection node between the transistors 4 and 7, a connection node between the transistors 5 and 8, and a connection node between the transistors 6 and 9 are connected to output terminals Out1, Out2 and Out3, respectively, which are connected to the armature coils of the motor 1, respectively.

Reference Numerals 10, 11 and 12 designate counter electromotive force comparators, which have their inverting input (−) connected through delay circuits 13, 14 and 15 to the armature coils of the motor 1, respectively, and their non-inverting input (+) connected in common to a neutral point of the motor 1.

Reference Numeral 16 denotes a phase comparing circuit having one input connected to an output of the reference oscillator 2 which is connected externally, and the other input connected to an output of the counter electromotive force comparator 10. Reference Numeral 17 indicates a low pass filter having an input connected to an output of the phase comparing circuit 16, and Reference Numeral 18 shows an integrator constituted of an operational amplifier having its non-inverting input (+) connected to an output of the low pass filter 17 and its inverting input (−) connected through a capacitor to an output of the operational amplifier itself and through a resistor to the source of the transistors 7, 8 and 9. Reference Numeral 19 designates a triangular wave generating circuit, and Reference Numeral 20 denotes a comparator having its non-inverting input (+) connected to an output of the integrator 18 and its inverting input (−) connected to an output of the triangular wave generating circuit 19.

Reference Numeral 21 indicates an output condition setting circuit receiving the output of the counter electromotive force comparators 10, 11 and 12, for outputting control signals T1, T2, T3, C1, C2 and C3 to a gate of the transistors 4, 5, 6, 7, 8 and 9, respectively.

Figure 11:
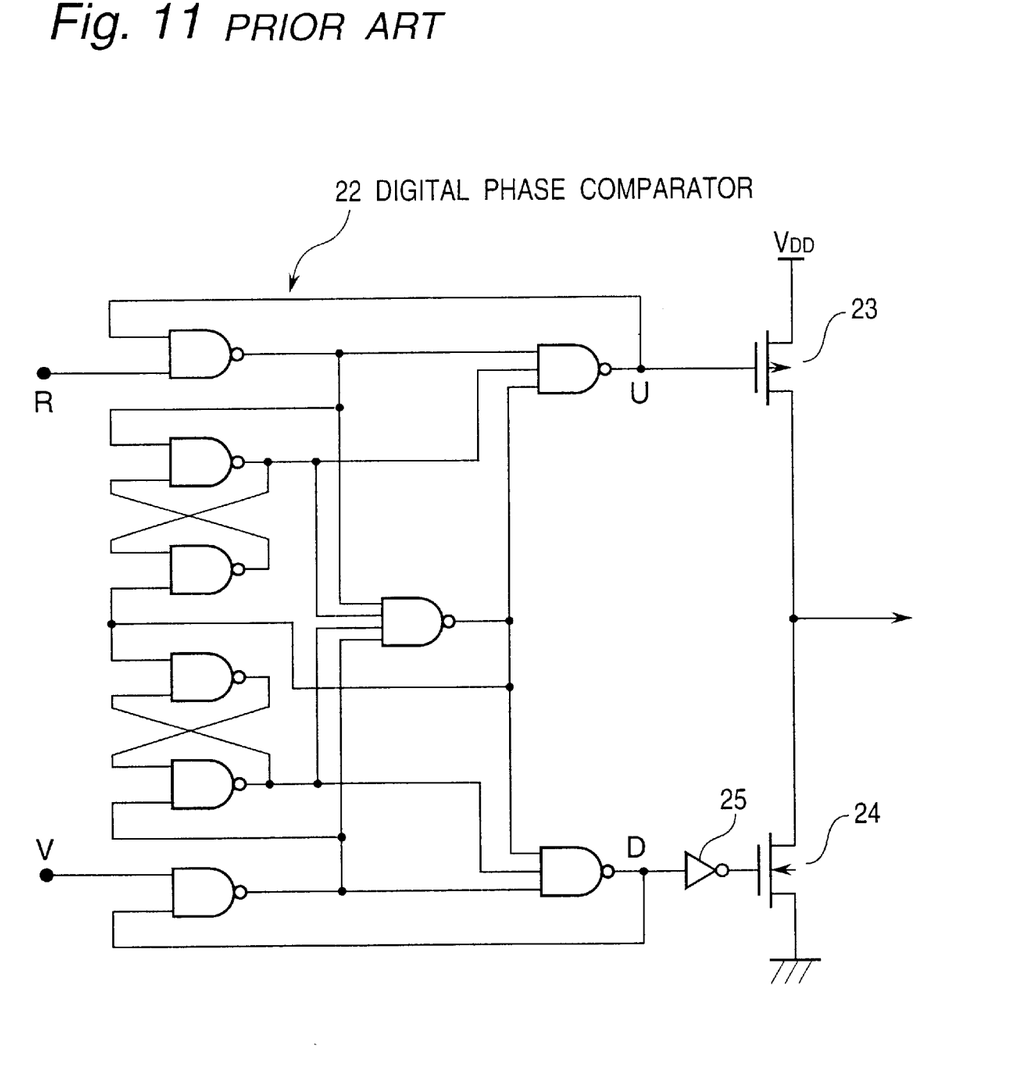
FIG. 11 is a circuit diagram illustrating the phase comparing circuit incorporated in the prior art motor controlling semiconductor integrated circuits shown in FIG. 10.

As shown in FIG. 11, which is a logic diagram of one example of the phase comparing circuit 16, the phase comparing circuit 16 includes a digital phase comparator 22 composed of NAND gates and latches formed of NAND gates, a p-channel MOS transistor 23 and an n-channel MOS transistor 24 connected in series between the power supply voltage terminal VDD and the ground, and an inverter 25. One input "R" of the digital phase comparator 22 is connected to receive the reference clock CLK outputted from the reference oscillator 2 and the other input "V" of the digital phase comparator 22 is connected to the output of the counter electromotive force comparator 10. One output "U" of the digital phase comparator 22 is connected to a gate of the transistor 23, and the other output "D" of the digital phase comparator 22 is supplied through the inverter 25 to a gate of the transistor 24. A connection node between the transistors 23 and 24 is connected to the low pass filter 17.

Now, an operation of the semiconductor integrated circuit having the above mentioned construction will be described also with reference to FIG. 12.

By on-off controlling the transistors 4, 5, 6, 7, 8 and 9 so as to cause a current to flow through each two of the three-phase armature coils, a rotor rotates in the motor. The current direction is caused to cyclically take six current directions of Out3 to Out2, Out3 to Out1, Out2 to Out1, Out2 to Out3, Out1 to Out3, and Out1 to Out2, in the named order. A counter electromotive force voltage generated at the end of each armature coil at each time the current direction is changed, is supplied through the delay circuit 13, 14 or 15 to the counter electromotive force comparator 10, 11 or 12, respectively. The counter electromotive force comparators 10, 11 and 12 compare the respective counter electromotive force voltages with the potential of the neutral point of the armature coils, to generate rotor position detection signals P1, P2 and P3 as shown in (a) of FIG. 12 to the output condition setting circuit 21. At the same time, the position detection signal P1 (or P2 or P3) is supplied to the input "V" of the phase comparing circuit 16. Incidentally, since the six current directions are cyclically repeated as mentioned above, the delay circuits 13, 14 and 15 delay the phase of the counter electromotive force voltage generated at the end of the armature coils by 60 degrees, so that the next condition of the current direction is supplied through the counter electromotive force comparators 10, 11 and 12 to the output condition setting circuit 21 as the position detection signals P1, P2 and P3.

The timing of supplying the current to the respective armature coils of the motor 1, is controlled as follows. In response to the position detection signals P1, P2 and P3, the output condition setting circuit 21 generate timing signals T1, T2 and T3 as shown in (b) of FIG. 12. These timing signals T1, T2 and T3 are supplied to the gate of the transistors 4, 5 and 6, respectively, for the purpose of on-off controlling the transistors 4, 5 and 6, thereby to control the timings of supplying the current to the respective armature coils of the motor 1.

On the other hand, the amount of the current supplied to the respective armature coils of the motor 1 is controlled as follows: The reference clock CLK having the frequency as a desired rotational frequency of the motor 1 is supplied from the reference oscillator 2 to the input "R" of the phase comparing circuit 16, and at the same time, the position detection signal P1 is supplied to the input "V" of the phase comparing circuit 16. The phase comparing circuit 16 compares the phase of the position detection signal P1 with the phase of the reference clock CLK, to output a phase difference signal through the low pass filter 17 to the non-inverted input (+) of the operational amplifier of the integrator 18. A load current flowing through the armature coils of the motor 1 is converted by the sense resistor 3 into a voltage, which is supplied to the resistor of the integrator 18. The voltage integrated in the integrator 18 and the output of the triangular wave generating circuit 19 are supplied to the comparator 20, which generates a PWM signal to the output condition setting circuit 21. The output condition setting circuit 21 generates current control signals C1, C2 and C3 at timings as shown in (c) of FIG. 12, which are supplied to the gate of the transistors 7, 8 and 9, respectively. Thus, in combination of the on-off of the transistors 4, 5 and 6 with the on-off of the transistors 7, 8 and 9, the PWM outputs as shown in (d) of FIG. 12 are obtained at the output terminals Out1, Out2 and Out3, so that the current direction cyclically takes the six current directions in the above mentioned order, and therefore, the motor 1 rotates.

In the above mentioned construction, the PLL control is carried out to make the reference clock CLK of the reference oscillator 2 consistent with the frequency of the position detection signal P1 of the counter electromotive force comparator 10, and the duty of the PWM signal is determined on the basis of the output of the phase comparing circuit 16 and the detected voltage obtained from the sense resistor 3. As a result, the on-duty of the transistors 7, 8 and 9 is controlled so as to control the current flowing through the motor, thereby to control the motor at a constant speed.

Figure 12:
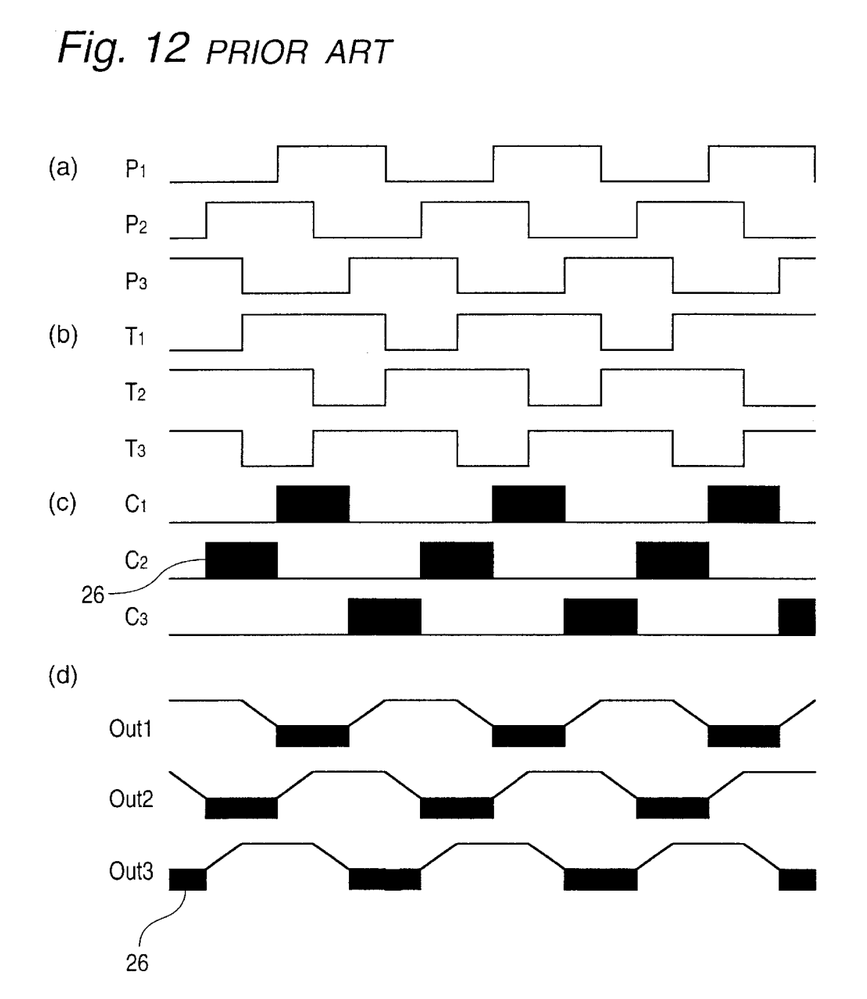
FIG. 12 is a timing chart illustrating an operation of the prior art motor controlling semiconductor integrated circuit shown in FIG. 10.

Incidentally, Reference Numeral 26 in FIG. 12 designates a high frequency oscillation condition of the PWM signal for controlling the on-duty of the transistors 7, 8 and 9. For example, the position detection signal P1 is on the order of 300 Hz, and on the other hand, the PWM signal is on the order of 100 KHz.

However, the above mentioned prior art semiconductor integrated circuit has the following disadvantages:

(1) Since the semiconductor integrated circuit includes the low pass filter 17, the integrator 18, the triangular wave generating circuit 19 and the comparator 20, the circuit size becomes large and therefore a necessary chip area is large.

(2) Since the transistors 7, 8 and 9 are on-off switched on the order of for example 100 KHz for each phase on the basis of the PWM control, switching noises are inevitably involved.

(3) Since the sense resistor 3 is connected in series with the transistors 4, 5 and 6 and the transistors 7, 8 and 9, a power loss occurs in the sense resistor 3, and therefore, in order to reduce the power loss in the whole of this series circuit, the transistors 4, 5, 6, 7, 8 and 9 having a small on-resistance become necessary, resulting in a further increased chip area.

SUMMARY OF THE INVENTION

Accordingly, it is an object of the present invention to provide a motor controlling semiconductor integrated circuit which has overcome the above mentioned defect of the conventional one.

Another object of the present invention is to provide a motor controlling semiconductor integrated circuit which can reduce the necessary circuit size, and can carry out the PWM control with a single pulse, and which no longer requires the sense resistor.

The above and other objects of the present invention are achieved in accordance with the present invention by a motor controlling semiconductor integrated circuit for controlling a motor by a PLL control, comprising output transistors for driving a motor, a position detecting means detecting a rotational position of a rotor in the motor, for generating a position detection signal, a phase comparing means comparing the position detection signal with a reference clock. For generating a phase difference detection signal, and means receiving the phase difference detection signal, for controlling an on-duty of the output transistors on the basis of a duty of the phase difference detection signal.

With the above mentioned arrangement, since the low pass filter, the integrator, the triangular wave generating circuit and the comparator, which were required in the prior art semiconductor integrated circuit, are no longer necessary, the circuit size can be reduced, and therefore, a necessary chip area can be reduced. In addition, since the output transistors are on-off switched at a low frequency on the order of 300 Hz, similar to the frequency of the position detection signal, switching noises can be greatly reduced. Furthermore, since the constant speed control can be carried out without monitoring the current of the motor by means of the sense resistor, it is no longer necessary to pay attention the voltage drop across the sense resistor, and therefore, the output transistors having an on-resistance larger than that of the prior art can be used, resulting in a reduced chip area for these transistors.

Specifically, the motor is a three-phase motor, and the position detecting means includes three counter electromotive force comparators each comparing a counter electromotive force generated in an armature coil of a corresponding phase when the motor is rotating, with a neutral point potential of the armature coils, for generating the position detection signal for the corresponding phase. The reference clock is set to have a frequency which is three times a desired rotational frequency of the motor. The position detection signals are supplied to a synthesis circuit for generating a synthesis signal having a frequency which is three times the frequency of the position detection signals, and the phase difference detection signal is supplied to the output transistors through an output condition setting circuit which frequency-divides the phase difference detection signal into the frequency of the position detection signals.

For example, the synthesis circuit includes three two-input NAND gates each receiving the outputs of each different two of the counter electromotive force comparators, and a three-input NAND gate receiving an output of the two-input NAND gates.

In addition, if two phase comparing circuits are provided in parallel, one of which directly receives the synthesis signal and the reference clock, and the other of which receives the synthesis signal and the reference clock through inverters, respectively, it is possible to control the output transistors in the on-duty range of 0 to 100%.

The above and other objects, features and advantages of the present invention will be apparent from the following description of preferred embodiments of the invention with reference to the accompanying drawings.

DESCRIPTION OF THE PREFERRED EMBODIMENTS

Now, a first embodiment of the motor controlling semiconductor integrated circuit in accordance with the present invention will be described with reference to FIG. 1 and FIGS. 3 to 8.

Figure 1:
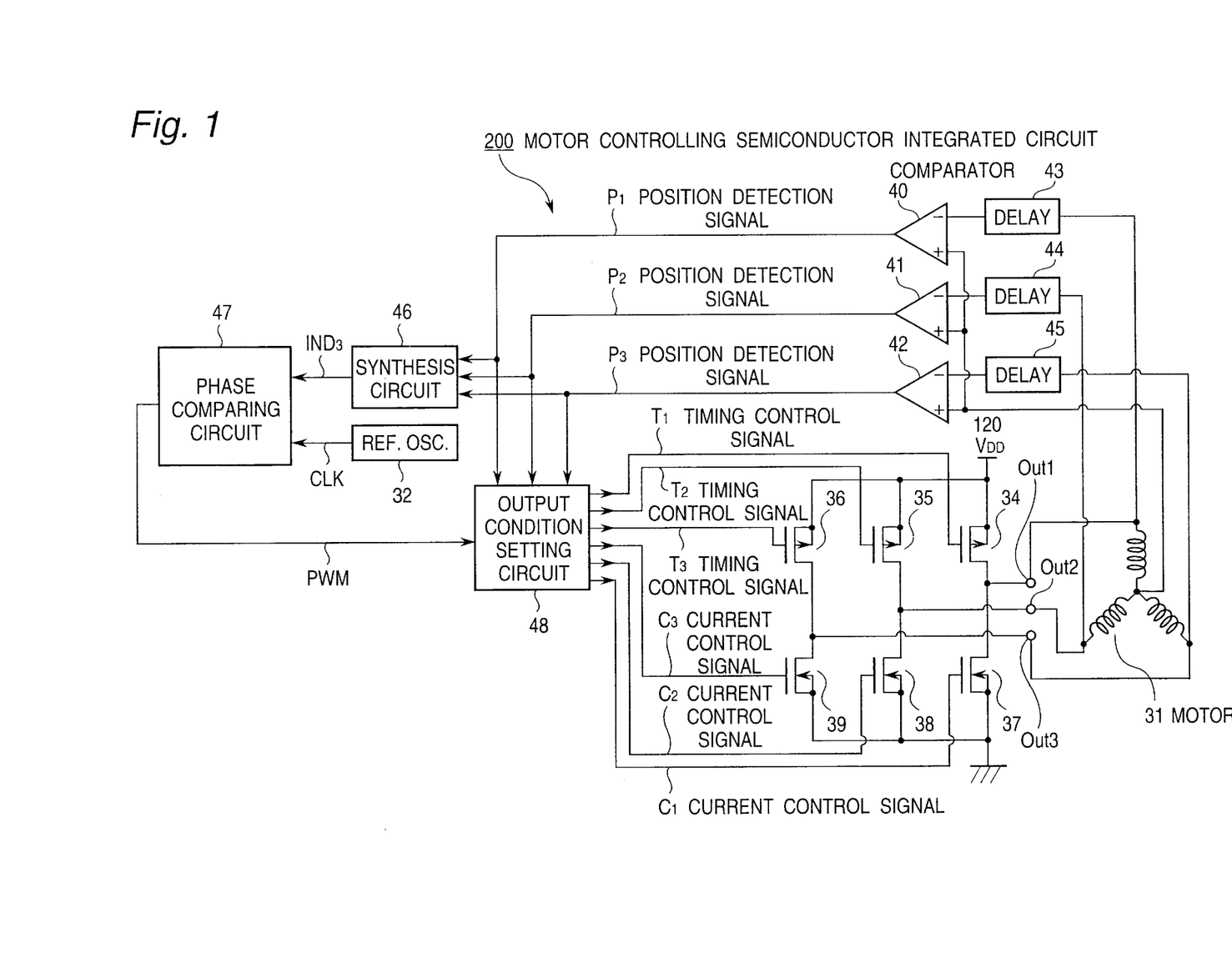
FIG. 1 is a block diagram of a first embodiment of the motor controlling semiconductor integrated circuit in accordance with the present invention.

In FIG. 1, the motor controlling semiconductor integrated circuit, which is generally designed with Reference Numeral 200, is connected to a three-phase motor (spindle motor) 31 to be controlled, and a reference oscillator 32 for generating a reference clock used for setting the number of revolution of the motor 31. The circuit further comprises a power supply terminal 120 connected to a DC power supply (not shown).

In the semiconductor integrated circuit 200, Reference Numerals 34, 35 and 36 designate output p-channel MOS transistors for controlling the timing of supplying the current to respective armature coils of the motor 31, and Reference Numerals 37, 38 and 39 denote output n-channel MOS transistors for controlling the amount of the current supplied to the respective armature coils of the motor 1. The transistors 34 and 37, 35 and 38, and 36 and 39 are connected in series, respectively. Respective sources of the transistors 34, 35 and 36 are connected in common to a power supply voltage terminal VDD connected to a DC power supply (not shown), and respective sources of the transistors 37, 38 and 39 are connected in common to ground. A connection node between the transistors 34 and 37, a connection node between the transistors 35 and 38, and a connection node between the transistors 36 and 39 are connected to output terminals Out1, Out2 and Out3, respectively, which are connected to the armature coils of the motor 31, respectively.

Reference Numerals 40, 41 and 42 designate counter electromotive force comparators, which have their inverting input (−) connected through delay circuits 43, 44 and 45 to the armature coils of the motor 31, respectively, and their non-inverting input (+) connected in common to a neutral point of the motor 31, for the purpose of comparing a coil end voltage of the respective armature coils of the motor 31 with a neutral point potential of the armature coils for detecting the rotational position of the rotor of the motor 31. Reference Numeral 46 denotes a synthesis circuit receiving position detection signals P1, P2 and P3 outputted from the counter electromotive force comparators 40, 41 and 42 for generating a synthesis signal IND3. Reference Numeral 47 indicates a phase comparing circuit for comparing the synthesis signal IND3 outputted from the synthesis circuit 46 with the reference clock CLK outputted from the reference oscillator 32, for generating a phase difference detection signal PWM.

Reference Numeral 48 indicates an output condition setting circuit receiving the position detection signals P1, P2 and P3 outputted from the counter electromotive force comparators 40, 41 and 42, for generating timing control signals T1, T2 and T3 supplied to a gate of the transistors 34, 35, and 36, respectively. The output condition setting circuit also receives the phase difference detection signal PWM outputted from the phase comparing circuit 47, for generating current control signals C1, C2 and C3 to a gate of the transistors 37, 38 and 39, respectively.

Figure 3:
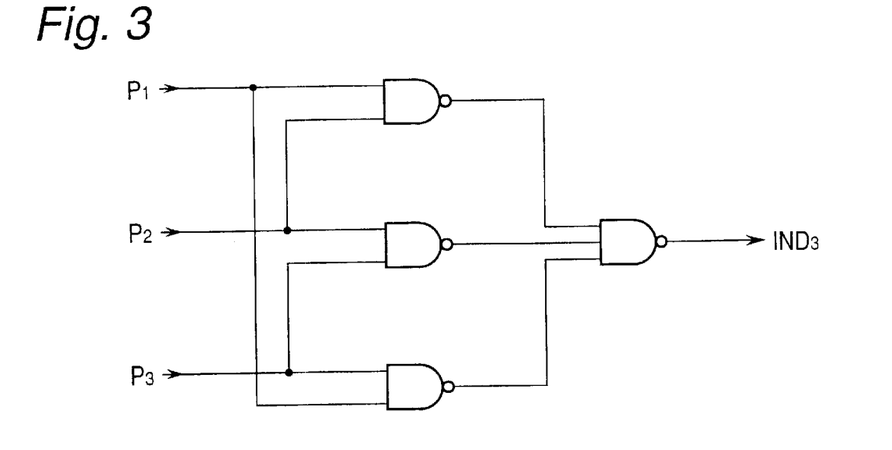
FIG. 3 is a circuit diagram illustrating an example of the synthesis circuit incorporated in the motor controlling semiconductor integrated circuits shown in FIGS. 1 and 2.

As shown in FIG. 3, the synthesis circuit 46 includes three two-input NAND gates receiving the two position detection signals P1 and P2, P2 and P3, and P3 and P1, respectively, and a three-input NAND gate receiving an output of all the three two-input NAND gates for generating the synthesis signal IND3.

Figure 4:
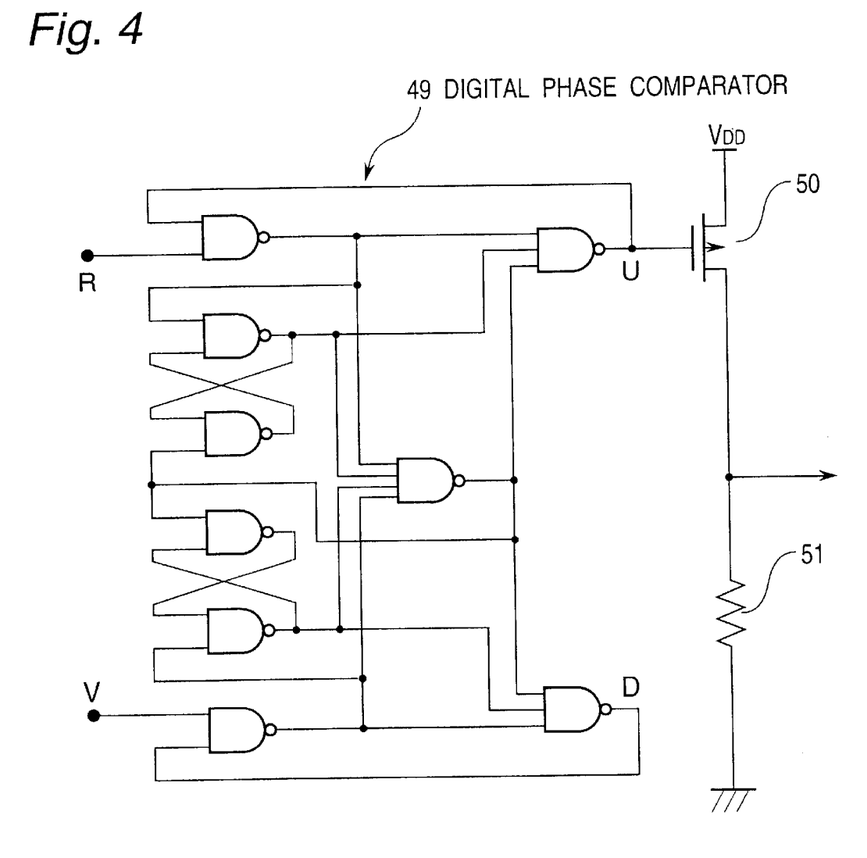
FIG. 4 is a circuit diagram illustrating an example of the phase comparing circuit incorporated in the motor controlling semiconductor integrated circuits shown in FIGS. 1 and 2.

As shown in FIG. 4, the phase comparing circuit 47 includes a digital phase comparator 49 composed of NAND gates and latches formed of NAND gates, and a p-channel MOS transistor 50 and a pull-down resistor 51 connected in series between the power supply voltage terminal VDD and the ground. One input "R" of the digital phase comparator 49 is connected to receive the reference clock CLK outputted from the reference oscillator 32 and the other input "V" of the digital phase comparator 49 is connected to the output of the synthesis circuit 46. One output "U" of the digital phase comparator 49 is connected to a gate of the transistor 50. A connection node between the transistor 50 and the resistor 51 is connected to the output condition setting circuit 48.

Figure 6:
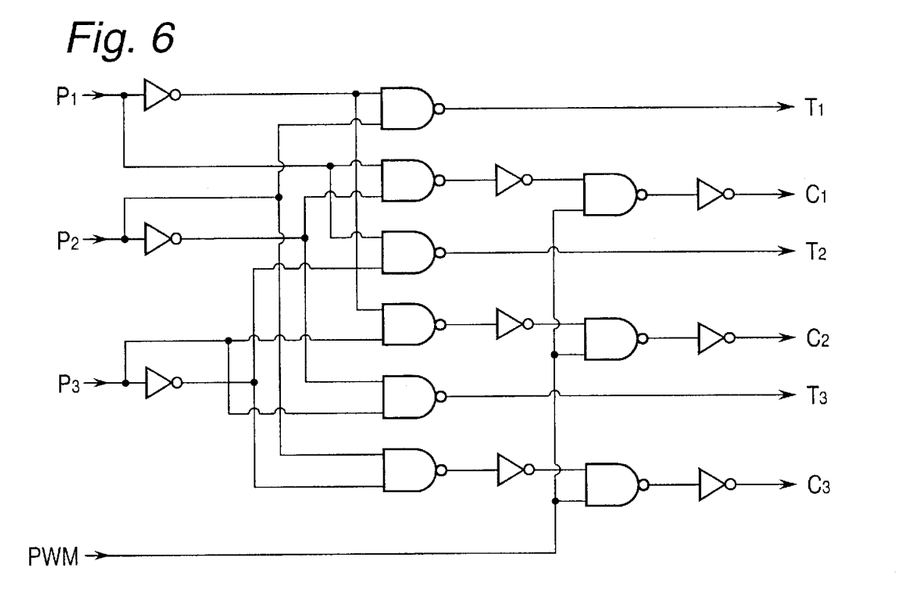
FIG. 6 is a circuit diagram illustrating an example of the output condition setting circuit incorporated in the motor controlling semiconductor integrated circuits shown in FIGS. 1 and 2.

The output condition setting circuit 48 is constituted of NAND gates and inverters connected as shown in FIG. 6, for generating the timing control signals T1, T2 and T3 and the current control signals C1, C2 and C3 in response to the position detection signals P1, P2 and P3 outputted from the counter electromotive force comparators 40, 41 and 42, respectively, and the phase difference detection signal PWM outputted from the phase comparing circuit 47.

Now, an operation of the above mentioned semiconductor integrated circuit 200 will be described also with reference to FIG. 7.

By on-off controlling the transistors 34, 35, 36, 37, 38 and 39 so as to cause a current to flow through each two of the three-phase armature coils, a rotor rotates in the motor. In this rotation of the motor, the current direction is caused to cyclically and alternatively take three current directions of Out3 to Out1, Out2 to Out3, and Out1 to Out2, in the named order. A counter electromotive force voltage generated at the end of each armature coil at each time the current direction is changed, is supplied through the delay circuit 43, 44 or 45 to the counter electromotive force comparators 40, 41 or 42, respectively. The counter electromotive force comparators 40, 41 and 42 compare the respective counter electromotive force voltages with the potential of the neutral point of the armature coils, to generate rotor position detection signals P1, P2 and P3 as shown in (a) of FIG. 7 to the synthesis circuit 46 and the output condition setting circuit 48. Incidentally, since the three current directions are cyclically repeated as mentioned above, the delay circuits 43, 44 and 45 delay the phase of the counter electromotive force voltage generated at the end of the armature coils by 60 degrees, so that the next condition of the current direction is supplied through the counter electromotive force comparators 40, 41 and 42 to the output condition setting circuit 48 as the position detection signals P1, P2 and P3.

The timing of supplying the current to the respective armature coils of the motor 31, is controlled as follows. In response to the position detection signals P1, P2 and P3, the output condition setting circuit 48 generates the timing signals T1, T2 and T3, as shown in (b) of FIG. 7. These timing signals T1, T2 and T3 are supplied to the gate of the transistors 34, 35 and 36, respectively, for the purpose of on-off controlling the transistors 34, 35 and 36, thereby to control the timings of supplying the current to the respective armature coils of the motor 31.

On the other hand, the amount of the current supplied to the respective armature coils of the motor 31 is controlled as follows: The position detection signals P1, P2 and P3 are synthesized by the synthesis circuit 46 to generate the synthesis signal IND3 having the frequency which is three times the frequency of the position detection signals as shown in (d) of FIG. 7. On the other hand, the reference clock CLK having the frequency which is three times a desired rotational frequency of the motor 31 as shown in (d) of FIG. 7, is supplied from the reference oscillator 32 to the input "R" of the phase comparing circuit 47, and at the same time, the synthesis signal IND3 is supplied to the input "V" of the phase comparing circuit 47. Thus, the phase comparing circuit 47 detects the deviation of the lagging phase of the synthesis signal IND3 in comparison with the reference clock CLK, and generates the phase difference signal having the duty of 0 to 50% determined by the amount of the deviation of the lagging phase, as shown in (f) of FIG. 7. This phase difference signal is supplied as the PWM signal to the output condition setting circuit 48.

Figure 7:
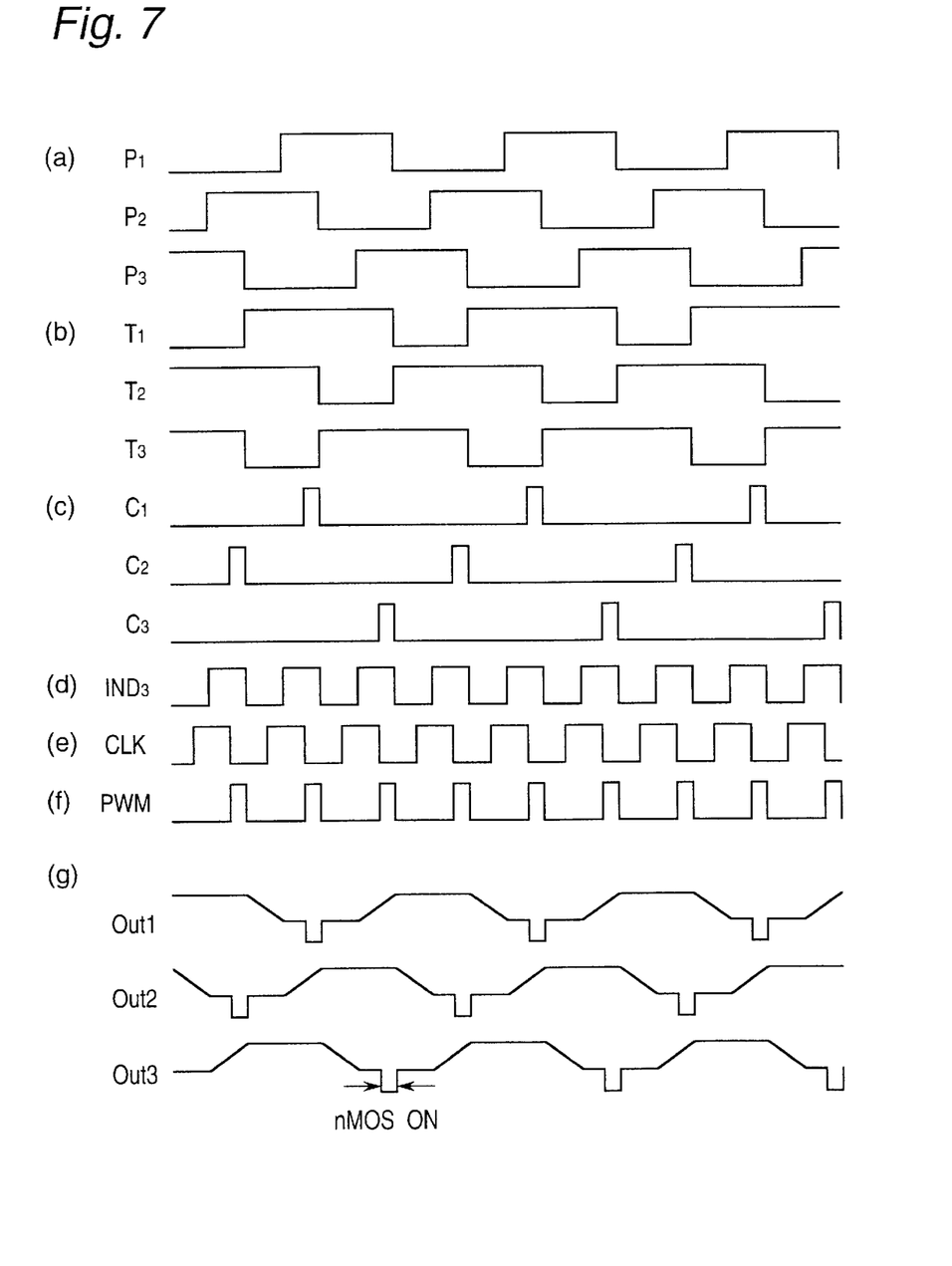
FIG. 7 is a timing chart illustrating an operation of the motor controlling semiconductor integrated circuit shown in FIGS. 1, incorporating therein the phase comparing circuit shown in FIG. 4.

In the output condition setting circuit 48, the PWM signal is frequency-divided by the position detection signals P1, P2 and P3 into the current control signals C1, C2 and C3 having the frequency of one third, as shown in (c) of FIG. 7. These current control signals C1, C2 and C3 are supplied to the gate of the transistors 37, 38 and 39, respectively. The on-duty of the transistors 37, 38 and 39 are determined by the duty of the PWM signal, and in combination of the on-off of the transistors 34, 35 and 36 with the on-off of the transistors 37, 38 and 39, the PWM outputs as shown in (g) of FIG. 7 are obtained at the output terminals Out1, Out2 and Out3, so that the current amount of the armature coils is controlled in the above mentioned order of the three current directions, and therefore, the number of revolutions in the motor 31 is determined.

In the above mentioned construction, a closed loop control circuit is realized to make the reference clock CLK of the reference oscillator 32 consistent with the frequency of the synthesis signal IND3, thereby to control the motor 31 at a constant speed. Incidentally, in a condition that the motor 31 rotates at the constant speed, the synthesis signal IND3 and the reference clock CLK become a stabilized condition in which the synthesis signal IND3 and the reference clock CLK deviates from each other in phase by a constant value compensating for a mechanical loss of the motor 31.

In the semiconductor integrated circuit 200 as mentioned above, since the low pass filter 17, the integrator 18, the triangular wave generating circuit 19 and the comparator 20, which were required in the prior art semiconductor integrated circuit 100, are no longer necessary, the circuit size becomes small, and therefore, a necessary chip area can be reduced. In addition, since the output transistors 37, 38 and 39 are on-off switched at a low frequency on the order of 300 Hz, similar to the frequency of the position detection signals P1, P2 and P3, switching noises can be greatly reduced. Furthermore, since the constant speed control can be carried out without monitoring the current of the motor by means of the sense resistor, it is no longer necessary to pay attention the voltage drop across the sense resistor, and therefore, the output transistors 34, 35, 36, 37, 38 and 39 having an on-resistance larger than that of the prior art can be used, resulting in a reduced chip area for these transistors. In this first embodiment, since the duty of the PWM signal is controlled in the range of 0 to 50%, the effect of limiting the current when the motor is started, is obtained.

Figure 5:
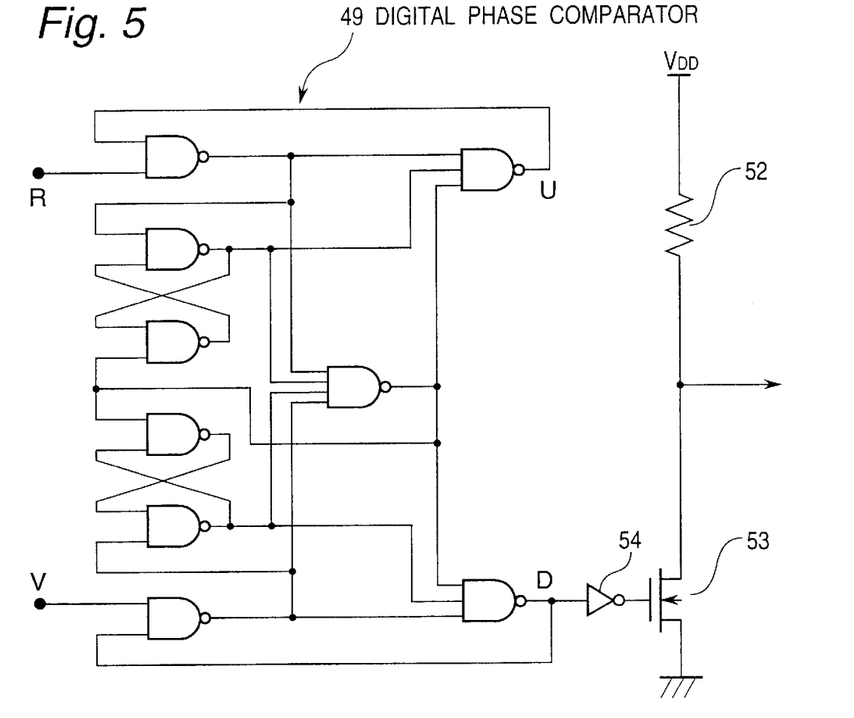
FIG. 5 is a circuit diagram illustrating another example of the phase comparing circuit incorporated in the motor controlling semiconductor integrated circuits shown in FIGS. 1 and 2.

Next, explanation will be made on the case that in the semiconductor integrated circuit 200, the phase comparing circuit shown in FIG. 5 is used as the phase comparing circuit 47 in place of the phase comparing circuit shown in FIG. 4.

The phase comparing circuit 47 shown in FIG. 5 includes a digital phase comparator 49 composed of NAND gates and latches formed of NAND gates, similarly to that shown in FIG. 4, a pull-up resistor 52 and an n-channel MOS transistor 53 connected in series between the power supply voltage terminal VDD and the ground, and an inverter 54. One input "R" of the digital phase comparator 49 is connected to receive the reference clock CLK outputted from the reference oscillator 32 and the other input "V" of the digital phase comparator 49 is connected to the output of the synthesis circuit 46. One input "D" of the digital phase comparator 49 is connected through the inverter 54 to a gate of the transistor 53. A connection node between the resistor 52 and the transistor 53 is connected to the output condition setting circuit 48.

Figure 8:
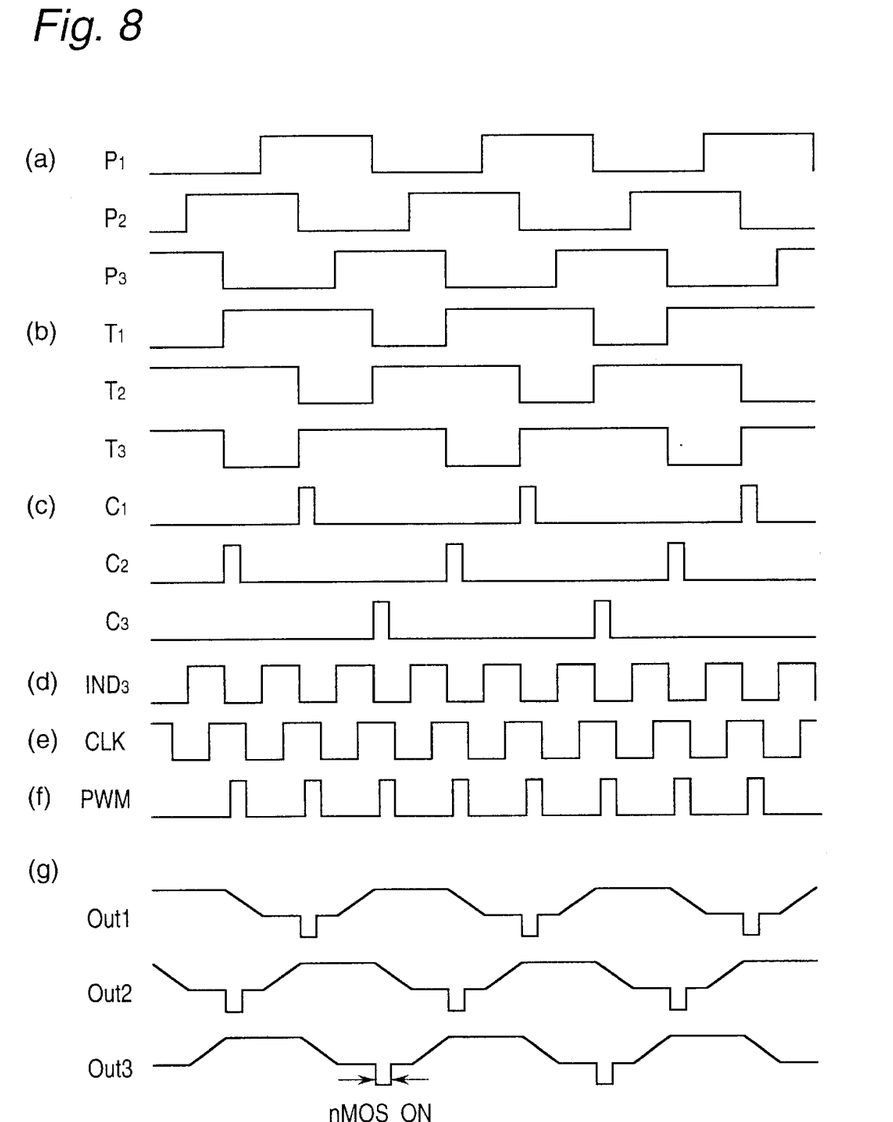
FIG. 8 is a timing chart illustrating an operation of the motor controlling semiconductor integrated circuit shown in FIGS. 1, incorporating therein the phase comparing circuit shown in FIG. 5.

FIG. 8 is a timing chart illustrating an operation of the motor controlling semiconductor integrated circuit shown in FIG. 1, incorporating therein the phase comparing circuit shown in FIG. 5. As shown in (d) to (f) of FIG. 8, the duty of the PWM signal is determined because the synthesis signal IND3 has the deviation of a leading phase in comparison with the reference clock CLK.

Figure 2:
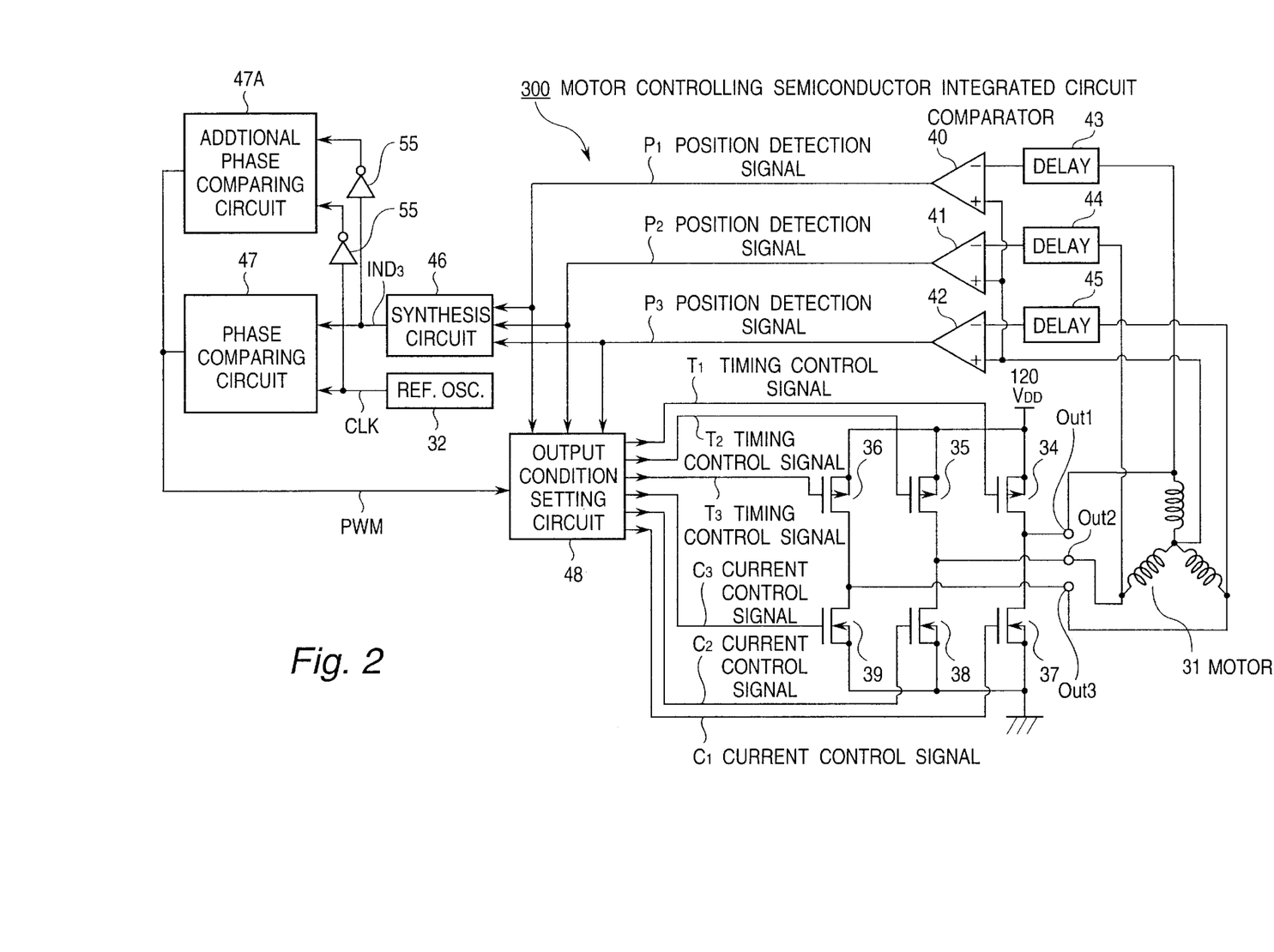
FIG. 2 is a block diagram of a second embodiment of the motor controlling semiconductor integrated circuit in accordance with the present invention.

Now, a second embodiment of the motor controlling semiconductor integrated circuit in accordance with the present invention will be described with reference to FIGS. 2 and 9. In FIG. 2, elements corresponding to those shown in FIG. 1 are given the same Reference Numerals, and explanation thereof will be omitted.

The motor controlling semiconductor integrated circuit, which is generally designated with Reference Numeral 300 in FIG. 2, is different from the first embodiment shown in FIG. 1, in that two phase comparing circuits 47 and 47A are provided in parallel. An additional phase comparing circuit 47A receives the synthesis signal IND3 and the reference clock CLK through inverters 55 and 55, respectively, and an output connected to the output of the phase comparing circuit 47.

Figure 9:
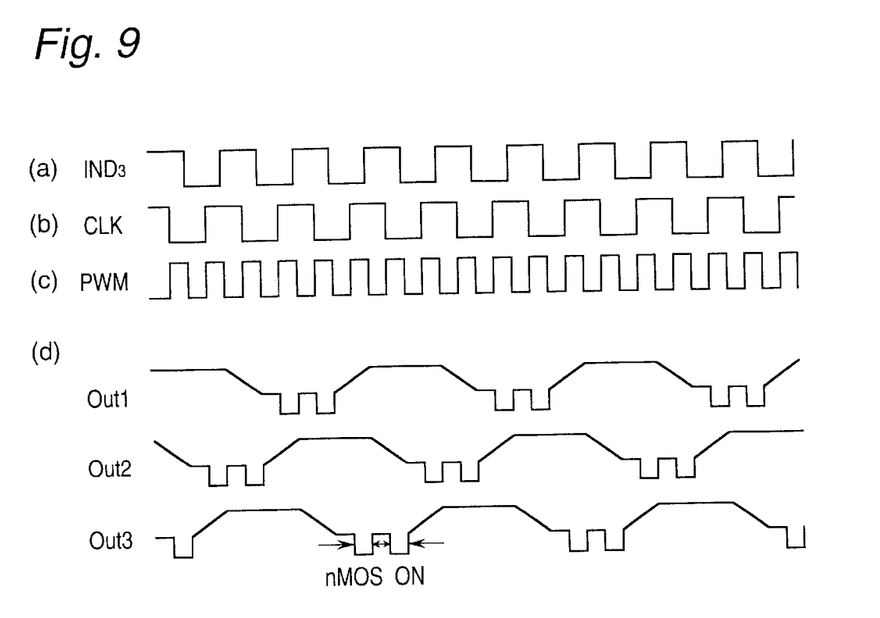
FIG. 9 is a timing chart illustrating an operation of the motor controlling semiconductor integrated circuit shown in FIGS. 2, incorporating therein the phase comparing circuit shown in FIG. 4.

FIG. 9 is a timing chart illustrating an operation of the motor controlling semiconductor integrated circuit shown in FIG. 2, incorporating therein the phase comparing circuit shown in FIG. 4. As with this arrangement, the current direction of the motor 31 is caused to cyclically and alternatively take six current directions of Out3 to Out2, Out3 to Out1, Out2 to Out1, Out2 to Out3, Out1 to Out3, and Out1 to Out2, in the named order. The PWM signal can have the duty of 0 to 100%. Not only the same advantage as that obtained in the first embodiment can be obtained in the second embodiment, but also the second embodiment can enlarge the control range of the output current.

Incidentally, the two phase comparing circuits 47 and 47A in this second embodiment can be replaced with the phase comparing circuit shown in FIG. 5.

As seen from the above, the motor controlling semiconductor integrated circuit in accordance with the present invention is characterized in that, the position detection signals of the three phases from the counter electromotive force comparators are converted by the synthesis circuit into a synthesis signal having the frequency which is three times that of the position detection signals, and in the phase comparing circuit, the synthesis signal is compared with the reference clock having the frequency which is three times the desired rotational frequency of the motor, to generate the PWM signal having the duty determined by the deviation of the lagging or leading phase. This PWM signal is combined with the position detection signals of the three phases, respectively, in the output condition setting circuit, so that the PWM signal is frequency-divided into the control signals having the frequency of one third, which are supplied to the output transistors for controlling the current amount of the output transistors.

With this arrangement, since the low pass filter, the integrator, the triangular wave generating circuit and the comparator, which were required in the prior art semiconductor integrated circuit, are no longer necessary, the circuit size becomes small, and therefore, a necessary chip area can be reduced. In addition, since the output transistors are on-off switched at a low frequency on the order of 300 Hz, similar to the frequency of the position detection signals, switching noises can be greatly reduced. Furthermore, since it is not necessary to monitor the current of the motor by means of the sense resistor, it is no longer necessary to pay attention the voltage drop across the sense resistor, and therefore, the output transistors having an on-resistance larger than that of the prior art can be used, resulting in a reduced chip area for these transistors.

In addition, by providing the two phase comparing circuits, it is possible to control the duty of the motor current in the range of 0 to 100%.

The invention has thus been shown and described with reference to the specific embodiments. However, it should be noted that the present invention is in no way limited to the details of the illustrated structures but changes and modifications may be made within the scope of the appended claims.

What is claimed is:

1. A motor controlling semiconductor integrated circuit for controlling a motor by a PLL control, comprising output transistors for driving a motor, a position detecting means detecting a rotational position of a rotor in said motor, for generating a position detection signal, a phase comparing means comparing said position detection signal with a reference clock, for generating a phase difference detection signal, and means receiving said phase difference detection signal, for controlling an on-duty of said output transistors by directly utilizing a duty of said phase difference detection signal as a PWM signal.

2. A motor controlling semiconductor integrated circuit as recited in claim 1, wherein said output transistors are on-off switched at a predetermined frequency no greater than 300 Hz.

3. A motor controlling semiconductor integrated circuit for controlling a motor by a PLL control, comprising output transistors for driving a motor, a position detecting means detecting a rotational position of a rotor in said motor, for generating a position detection signal, a phase comparing means comparing said position detection signal with a reference clock, for generating a phase difference detection signal, and means receiving said phase difference detection signal, for controlling an on-duty of said output transistors on the basis of a duty of said phase difference detection signal, wherein said motor is a three-phase motor, and said position detecting means includes three counter electromotive force comparators each comparing a counter electromotive force generated in an armature coil of a corresponding phase when said motor is rotating, with a neutral point potential of said armature coils, for generating said position detection signal for said corresponding phase, and wherein said reference clock is set to have a frequency which is three times a desired rotational frequency of said motor, and said position detection signals are supplied to a synthesis circuit for generating a synthesis signal having a frequency which is three times the frequency of said position detection signals, and said phase difference detection signal is supplied to said output transistors through an output condition setting circuit which frequency-divides said phase difference detection signal into the frequency of said position detection signals.

4. A motor controlling semiconductor integrated circuit claimed in claim 3 wherein said synthesis circuit includes three two-input NAND gates each receiving said outputs of each different two of said counter electromotive force comparators, and a three-input NAND gate receiving an output of said two-input NAND gates.

5. A motor controlling semiconductor integrated circuit claimed in claim 3 wherein two phase comparing circuits are provided in parallel, one of which directly receives said synthesis signal and said reference clock, and the other of which receives said synthesis signal and said reference clock through inverters, respectively.

6. A motor controlling semiconductor integrated circuit having a power supply voltage terminal connected to a DC power supply, a ground terminal, a clock input terminal connected to a reference oscillator for generating a reference clock, and output terminals connected to a three-phase motor for controlling the three-phase motor at a constant speed, the integrated circuit including:

timing control output transistors and current control output transistors connected in series between said power supply voltage terminal and said ground terminal, a connection node between said timing control output transistors and said current control output transistors being connected to said output terminals, respectively;

counter electromotive force comparators for comparing counter electromotive force voltages generated in armature coils of respective phases, with the potential of the neutral point of said armature coils, to generate rotor position detection signals, when said motor rotates;

a synthesis circuit receiving said position detection signals for generating a synthesis signal having the frequency which is three times that of said position detection signals;

a phase comparing circuit comparing said synthesis signal with said reference clock having the frequency which is three times the desired rotational frequency of said motor, for generating a phase difference signal; and an output condition setting circuit receiving said position detection signals and said phase difference signal, said output condition setting circuit generating, on the basis of said position detection signals, timing control signals supplied to said timing control output transistors, respectively, said output condition setting circuit also generating, on the basis of said position detection signals and said phase difference signal, current control signals supplied to said current control output transistors, respectively.

* * * * *